Jan. 27, 1931.   O. SUHNER   1,790,446
MEANS FOR MOUNTING ROTATING BODIES UPON DRIVING SHAFTS
Filed Feb. 20, 1930   2 Sheets-Sheet 1

O. Suhner
INVENTOR

Jan. 27, 1931.  O. SUHNER  1,790,446
MEANS FOR MOUNTING ROTATING BODIES UPON DRIVING SHAFTS
Filed Feb. 20, 1930  2 Sheets-Sheet 2
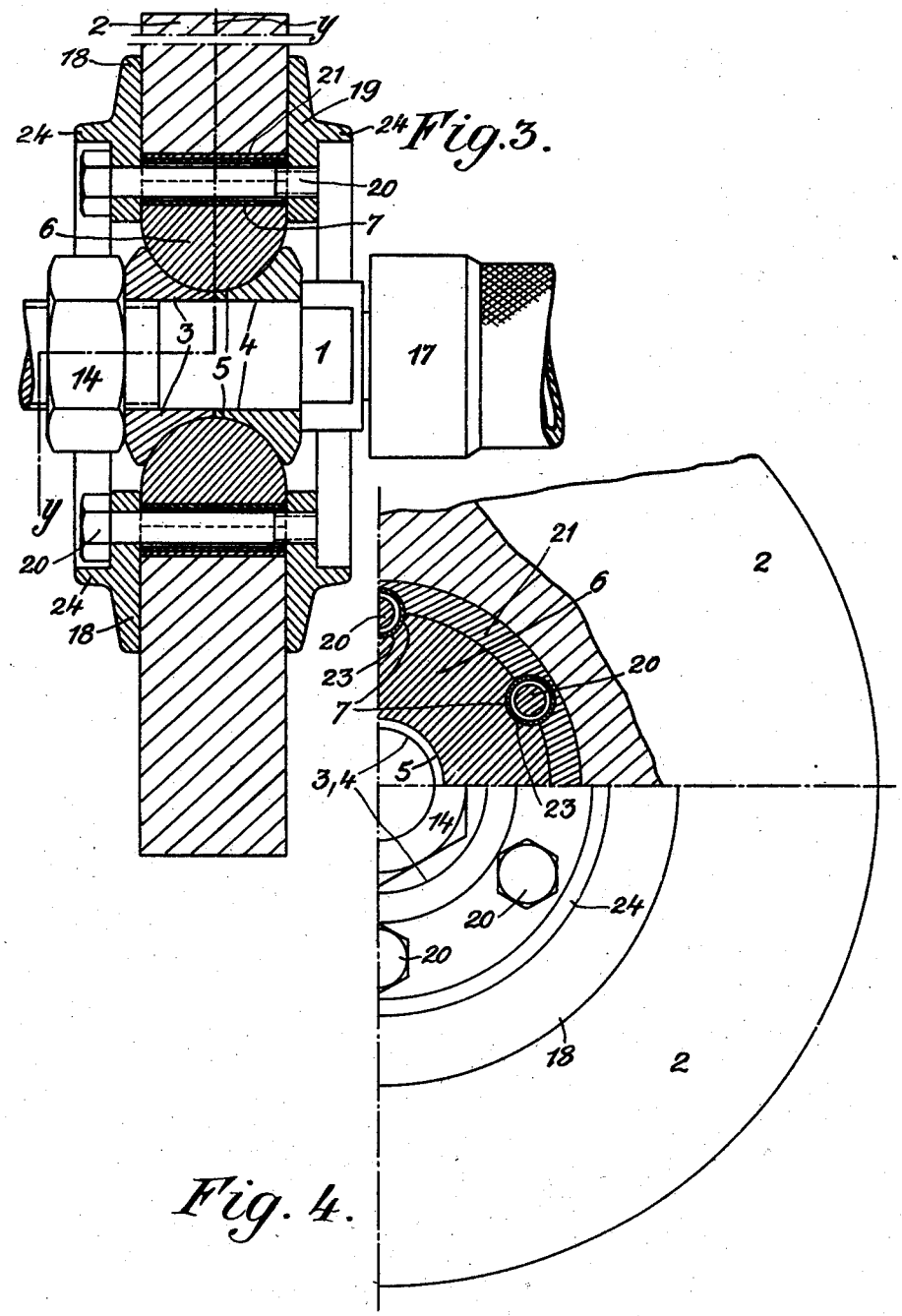

Patented Jan. 27, 1931

1,790,446

UNITED STATES PATENT OFFICE

OTTO SUHNER, OF BRUGG, SWITZERLAND

MEANS FOR MOUNTING ROTATING BODIES UPON DRIVING SHAFTS

Application filed February 20, 1930, Serial No. 430,074, and in Switzerland February 27, 1929.

Bearing devices for the wheels of road vehicles are already known, in which an indiarubber sleeve is interposed between the axle and the hub of the wheel. In that case however only a yielding support of the wheel upon a non-rotatable axle is contemplated. Indiarubber insertions in joint connections are also known.

Now the present invention relates to a bearing device for rotating bodies such as grinding wheels for example, in which an indiarubber ring not only serves the purpose of yieldingly supporting the wheel but also serves as a means for transmitting power from a driving shaft to the revolving body. This aim is attained according to the invention by nipping the indiarubber ring between two pressure cones mounted upon the shaft and forming together a recess, and by the fact that two nipping flanges bolted together establish a nipping and driving connection between the indiarubber ring and the rotating body, but permit a self-centering of the latter.

Figure 1:
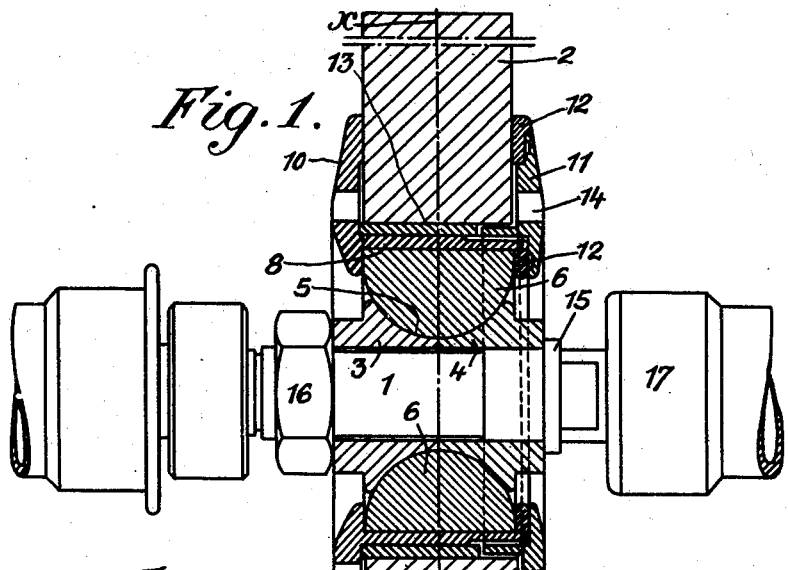
Figure 2:
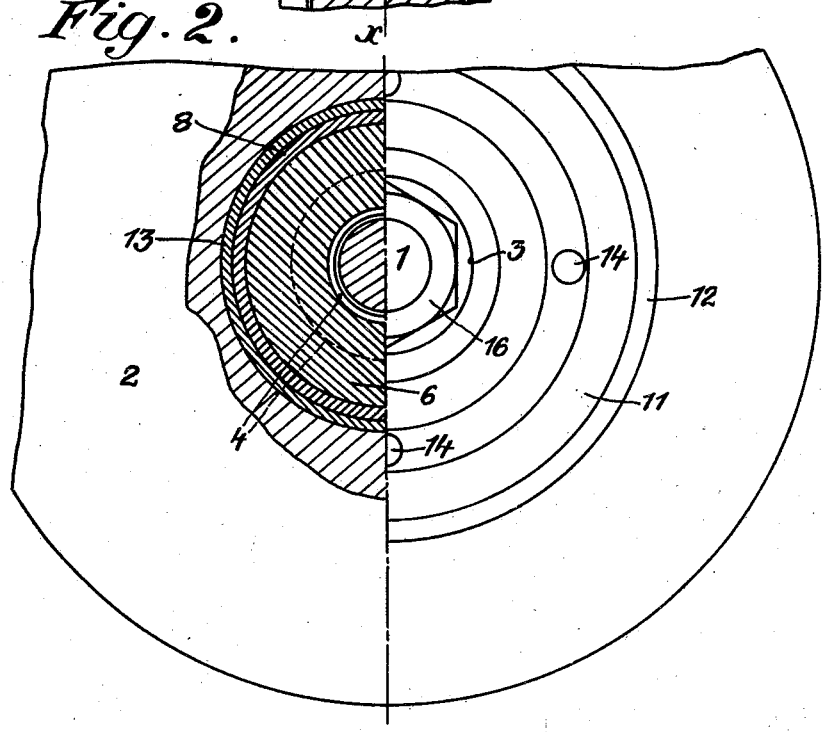

Two constructional examples of the invention are illustrated in the accompanying drawings, in which Figure 1 shows a cross section through the bearing device of the first constructional form, and Figure 2 a partial section on the line x—x in Figure 1.

Figure 3 shows a cross section through the second constructional form, and

Figure 4 a partial section thereof on the line y—y in Figure 3.

In the case of the present example, the rotating body is assumed to be a grinding disc, and the driving of the grinding disc is effected by means of a flexible shaft. In the example according to Figs. 1 and 2, 1 denotes the driving shaft and 2 the grinding wheel. Upon the shaft are mounted two pressure cones 3 and 4, which abut against one another and which form together a channel 5 of semi-circular cross section. In this channel an annular indiarubber body 6 rests with its roll-shaped internal surface. The rubber body 6 is pressed by the pressure cones 3 and 4 against the internal surface of a steel sleeve 8. This steel sleeve 8 forms the hollow cylindrical shank of a screw constructed as a nipping flange 10. A nut 11 constructed as a counter-nipping flange is screwed on above the external thread of the hollow shank and presses with loose intermediate rings 12 upon the grinding disc 2 and upon the indiarubber ring 6. It is easy to see that with increasing nipping pressure, by tightening the nut 11 an increasingly secure connection of the rubber ring 6 with the grinding wheel is provided. Owing to the connection of the grinding disc 2 with the rubber ring 6 by means of the nipping flanges 10 and 11, the rubber ring 6 is caused to assist in transmitting the torque. Since between the internal nipping of the indiarubber ring 6 by the sleeves 3 and 4 and the external nipping thereof by means of the nipping flanges 10 and 11 a portion of the ring 6 remains free, an automatic centering of the grinding disc is effected after initial rocking of the grinding disc upon the normal speed of revolution being attained, owing to the action of centrifugal force, that is to say, the central plane thereof suddenly adjust itself perpendicularly to the shaft 1. Owing to the loose rings 12, when the nipping flanges 11 are being tightened, the grinding disc 2 and the rubber ring 6 are prevented from rotating with them. Holes 14 provided in the nipping flanges serve for the reception of the driving pins of an insertion spanner or key. The mutually abutting bushes 3 and 4 are secured in their position on the one hand by a fitting 15 on the axle and on the other hand by the tightening of the nut 16 on the shaft 1. 17 shows a piece of the handle through which the flexible shaft passes.

The constructional example according to Figures 3 and 4 shows the arrangement of two nipping or clamping flanges 18 and 19 which are connected with one another by means of screws 20. Here the grinding wheel has a white metal sleeve 21, which bears upon the indiarubber body 6. This sleeve is provided with semi-cylindrical recesses. The recesses in the indiarubber body and in the sleeve combine to form cylindrical bores which permit of the introduction of screws 20, which serve both as tappets for the grinding wheel and for the tightening of the clamping flanges. In order to prevent friction between the indiarubber body and the screws when tightening or loosening the screws, bushes 23 are fitted in. For the protection of the operator the clamping flanges are provided with annular ribs 24, which cover the heads of the screws.

From the above description it will be seen that owing to the arrangement described the grinding proceeds without vibrations since any sudden pressure of the work is so compensated for by virtue of the resilient supporting of the grinding wheel that uniform grinding takes place, with automatic centering of the grinding wheel. At the same time the effect is enhanced, since every grain on the entire breadth of the wheel comes into action. It follows from this that for equal wear a higher output capacity is obtained than with ordinary grinding wheels. The danger of the grinding wheel flying off is eliminated by the self-centering, as compared with corresponding wheels having eccentric bearings. Furthermore by the present bearing device it is rendered possible to machine a piece of work with the grinding wheel right into all the details and practically to exclude filing work altogether.

The present device can also be fitted to any existing stationary grinding plant, provided it is mounted on a rigid shaft. Instead of the working disc being pressed against the clamped workpiece, the workpiece must on the contrary be pressed against the working disc.

The indiarubber body might also be provided itself with bores for the reception of the fastening bolts for the clamping flanges, and the metal bushes 3 and 4 might also be provided with ribs engaging in grooves in the indiarubber ring.

What I claim is:—

1. Means for mounting an annular rotating body upon a driving shaft, comprising two pressure cones mounted on the driving shaft with their smaller ends close together, the external surfaces of the pressure cones being of such shape that they form together an annular groove, an indiarubber ring located in the annular groove between the pressure cones and the internal periphery of the rotating body, and two clamping flanges screwed together and gripping between them the rotating body and the indiarubber ring, an annular portion of which comprised between the pressure cones and the clamping flanges being free to permit self-centering of the rotating body.

2. Means for mounting an annular rotating body upon a driving shaft, comprising two pressure cones mounted on the driving shaft with their smaller ends close together, the external surfaces of the pressure cones being of such shape that they form together an annular groove, an indiarubber ring located in the annular groove between the pressure cones and the internal periphery of the rotating body, a clamping flange adapted to bear against the rotating body and the indiarubber ring on one side, an externally screw-threaded cylindrical member rigid with the said clamping flange and adapted to pass through the central aperture in the rotating body, an internally screw-threaded clamping flange adapted to engage with the externally screw-threaded cylindrical member and to bear against the other side of the rotating body and of the indiarubber ring, a loose ring interposed between the rotating body and the adjacent surface of the internally threaded flange, and a second loose ring interposed between the indiarubber ring and the adjacent surface of the internally threaded flange.

3. Means for mounting an annular rotating body upon a driving shaft, comprising two pressure cones mounted on the driving shaft with their smaller ends close together, the external surfaces of the pressure cones being of such shape that they form together an annular groove, an indiarubber ring located in the annular groove between the pressure cones and the internal periphery of the rotating body, a clamping flange adapted to bear against the rotating body and the indiarubber ring on one side, an externally screw-threaded cylindrical member rigid with the said clamping flange and adapted to pass through the central aperture in the rotating body, and an internally screw-threaded clamping flange adapted to engage with the externally screw-threaded cylindrical member and to bear against the other side of the rotating body and of the indiarubber ring, the two clamping flanges being formed with holes adapted to engage with a spanner for the purpose of tightening and loosening the said flanges.

4. Means for mounting an annular rotating body upon a driving shaft, comprising two pressure cones mounted on the driving shaft with their smaller ends close together, the external surfaces of the pressure cones being of such shape that they form together an annular groove, an indiarubber ring located in the annular groove between the pressure cones and the internal periphery of the rotating body, two clamping flanges gripping between them the rotating body and the indiarubber ring, and screws extending through the central aperture in the rotating body to secure the two flanges to one another, the indiarubber ring being formed with longitudinal recesses in its external periphery adapted to engage with the screws.

5. Means for mounting an annular rotating body upon a driving shaft, comprising two pressure cones mounted on the driving shaft with their smaller ends close together, the external surfaces of the pressure cones being of such shape that they form together an annular groove, an indiarubber ring located in the annular groove between the pressure cones and the internal periphery of the rotating body, two clamping flanges gripping between them the rotating body and the indiarubber ring, screw bolts extending through the central aperture in the rotating body to secure the two flanges to one another, the indiarubber ring being formed with longitudinal recesses in its external periphery adapted to engage with the screw bolts, nuts co-acting with the screw bolts, and circular protecting ribs on the outer faces of the two flanges surrounding the bolt heads and nuts.

6. Means for mounting an annular rotating body upon a driving shaft, comprising an abutment on the driving shaft, two pressure cones mounted on the driving shaft with their smaller ends close together, one of the pressure cones bearing against the abutment, a screw thread on the driving shaft, a nut engaging with the screw thread on the driving shaft and adapted when screwed up to press the pressure cone that is remote from the abutment towards the other and thereby to press the other pressure cone against the abutment, the external surfaces of the pressure cones being of such shape that they form together an annular groove, an indiarubber ring located in the annular groove, between the pressure cones and the internal periphery of the rotating body, and two clamping flanges screwed together and gripping between them the rotating body and the indiarubber ring.

7. Means for mounting an annular rotating body upon a flexible driving shaft, comprising a rigid shaft element, means for connecting the rigid shaft element to the flexible driving shaft for power transmission, two pressure cones mounted on the rigid shaft element with their smaller ends close together, the external surfaces of the pressure cones being of such shape that they form together an annular groove, an indiarubber ring located in the annular groove between the pressure cones and the internal periphery of the rotating body, and two clamping flanges screwed together and gripping between them the rotating body and the indiarubber ring.

8. Means for mounting an annular grinding wheel upon a driving shaft, comprising two pressure cones mounted on the driving shaft with their smaller ends close together, the external surfaces of the pressure cones being of such shape that they form together an annular groove, an indiarubber ring located in the annular groove between the pressure cones and the internal periphery of the grinding wheel, and two clamping flanges screwed together and gripping between them the grinding wheel and the indiarubber ring.

9. Means for mounting an annular grinding wheel upon a flexible driving shaft, comprising a rigid shaft element, means for connecting the rigid shaft element to the flexible driving shaft for power transmission, an abutment on the rigid shaft element, two pressure cones mounted on the rigid shaft element with their smaller ends close together, one of the pressure cones bearing against the abutment, a screw thread on the rigid shaft element, a nut engaging with the screw thread on the rigid shaft element and adapted when screwed up to press the pressure cone that is remote from the abutment towards the other and thereby to press the other pressure cone against the abutment, an indiarubber ring located in the annular groove between the pressure cones and the internal periphery of the grinding wheel, a clamping flange adapted to bear against the rotating body and the indiarubber ring on one side, an externally screw-threaded cylindrical member rigid with the said clamping flange and adapted to pass through the central aperture in the rotating body, an internally screw-threaded clamping flange adapted to engage with the externally screw-threaded cylindrical member and to bear against the other side of the rotating body and of the indiarubber ring, a loose ring interposed between the rotating body and the adjacent surface of the internally threaded flange, and a second loose ring interposed between the indiarubber ring and the adjacent surface of the internally threaded flange, the two clamping flanges being formed with holes adapted to engage with a spanner for the purpose of tightening and loosening the said flanges.

10. Means for mounting an annular grinding wheel upon a flexible driving shaft, comprising a rigid shaft element, means for connecting the rigid shaft element to the flexible driving shaft for power transmission, an abutment on the rigid shaft element, two pressure cones mounted on the rigid shaft element with their smaller ends close together, one of the pressure cones bearing against the abutment, a screw thread on the rigid shaft element, a nut engaging with the screw thread on the rigid shaft element and adapted when screwed up to press the pressure cone that is remote from the abutment towards the other and thereby to press the other pressure cone against the abutment, the external surfaces of the pressure cones being of such shape that they form together an annular groove, an indiarubber ring located in the annular groove between the pressure cones and the internal periphery of the grinding wheel, two clamping flanges gripping between them the rotating body and the indiarubber ring, screw bolts extending through the central aperture in the rotating body to secure the two flanges to one another, the indiarubber ring being formed with longitudinal recesses in its external periphery adapted to engage with the screw bolts, nuts co-acting with the screw bolts, and circular protecting ribs on the outer faces of the two flanges surrounding the bolt heads and nuts.

In testimony whereof I have affixed my signature.

OTTO SUHNER.